(12) United States Patent
Wei (10) Patent No.: US 10,670,835 B2
(45) Date of Patent: Jun. 2, 2020

(54) LENS MODULE

(71) Applicant: AAC Technologies Pte. Ltd., Singapore (SG)

(72) Inventor: Chuandong Wei, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/528,676

(22) Filed: Aug. 1, 2019

(65) Prior Publication Data

US 2020/0049951 A1 Feb. 13, 2020

(30) Foreign Application Priority Data

Aug. 7, 2018 (CN) ...................... 2018 2 1267611 U (51) Int. Cl.
*G02B 13/00* (2006.01)
*H04N 5/225* (2006.01)

(52) U.S. Cl.
CPC ....... *G02B 13/0015* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 8,675,127 B2* | 3/2014 | Nakajima | ............ | H04N 5/2253 348/374 |
| 9,609,195 B2* | 3/2017 | Czepowicz | ............ | G03B 17/12 |
| 10,609,262 B2* | 3/2020 | Kim | .................. | G02B 27/0006 |
| 2004/0223074 A1* | 11/2004 | Takada | .................. | G02B 7/026 348/360 |
| 2005/0275740 A1* | 12/2005 | Nagano | .................... | G02B 7/08 348/335 |
| 2012/0019940 A1* | 1/2012 | Lu | .......................... | G02B 7/025 359/819 |
| 2019/0137724 A1* | 5/2019 | Kim | ........................ | G02B 9/60 |

* cited by examiner

*Primary Examiner* — James M Hannett
(74) *Attorney, Agent, or Firm* — W&G Law Group LLP (57) ABSTRACT

The present disclosure relates to the field of optical lenses and discloses a lens module, including a lens barrel, a first lens, a second lens and a third lens, which are accommodated in the lens barrel and are sequentially stacked from an object side to an image side. The first lens includes a first optical portion and a first connection portion surrounding the first optical portion. An image side surface of the first connection portion includes a first planar surface, a first engaging oblique surface extending from the first planar surface in a direction facing towards an optical axis, and a second planar surface extending from the first engaging oblique surface in the direction facing towards the optical axis. The lens module provided by the present disclosure can improve the matching accuracy between the lenses and the lens barrel, and thus guarantees the performance of the lens module.

9 Claims, 7 Drawing Sheets

LENS MODULE

TECHNICAL FIELD

The present disclosure relates to the field of optical lenses, and in particular, to a lens module.

BACKGROUND

In recent years, with the development of imaging technologies and the advance of electronic products with imaging functions, optical imaging lenses are widely applied to various electronic products. In addition to the electronic products (e.g., digital cameras, tablet PCs and mobile phones), public transport vehicles are also equipped with lens modules, which are called vehicle-mounted lenses. Currently, the vehicle-mounted lens generally includes a lens barrel and a plurality of lenses disposed in the lens barrel. The plurality of lenses is assembled in the lens barrel by simply stacking.

The inventors have found the following problem existing in the prior art: since the lenses are assembled in the lens barrel by simply stacking, the matching accuracy between the lenses and the lens barrel is not high, which adversely influences the performance of the lens module.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments.

A first embodiment of the present disclosure relates to a lens module 100. As shown in FIGS. 1-4, the lens module 100 includes a lens barrel 11, a first lens 12, a second lens 13 and a third lens 14. The first lens 12, the second lens 13 and the third lens are accommodated in the lens barrel 11 and sequentially stacked from an object side to an image side. The first lens 12 includes a first optical portion 121 and a first connection portion 122 surrounding the first optical portion 121. An image side surface 1221 of the first connection portion 122 includes a first planar surface 1221a, a first engaging oblique surface 1221b extending from the first planar surface 1221a in a direction facing towards an optical axis OO', and a second planar surface 1221c extending from the first engaging oblique surface 1221b towards the optical axis OO'. The lens barrel 11 includes a first lens barrel 111 accommodating the first lens 12 and a second lens barrel 112 connected to the first lens barrel 111. The first lens barrel 111 includes a first vertical portion 1111 fixedly connected to the second lens barrel 112 and a first horizontal portion 1112 extending from the first vertical portion 1111 while being bent towards the optical axis OO'. The first horizontal portion 1112 has a surface close to the image side, which is fixedly attached to an object side surface 1222 of the first connection portion 122. The second lens barrel 112 includes a third planar surface 1121 opposite to and spaced apart from the first planar surface 1221a, a first matching surface 1122 extending from the third planar surface 1121 in the direction facing towards the optical axis OO' and matching the first engaging oblique surface 1221b, and a fourth planar surface 1123 extending from the first matching surface 1122 in the direction facing towards the optical axis OO'. The fourth planar surface 1123 is spaced apart from the second planar surface 1221c. The second lens 13 includes a second optical portion 131 and a second connection portion 132 surrounding the second optical portion 131. An image side surface 1321 of the second connection portion 132 includes a fifth planar surface 1321a, a second engaging oblique surface 1321b extending from the fifth planar surface 1321a in a direction facing towards the image side and towards the optical axis OO', and a sixth planar surface 1321c extending from the second engaging oblique surface 1321b in the direction facing towards the optical axis OO'. The second lens barrel 112 includes a seventh planar surface 1124 spaced apart from the fifth planar surface 1321a, a second matching surface 1125 extending from the seventh planar surface 1124 in the direction facing towards the image and towards the optical axis OO' and attaching to the second engaging oblique surface 1321a, and an eighth surface 1126 extending from the second matching surface 1125 towards the image side and in a direction parallel to the optical axis OO'. The second lens barrel 112 further includes a groove 1127 formed by recessing from the third planar surface 1121 towards the image side. A rubber gasket 15 is disposed in the groove 1127. The first lens 12 is pressed against the rubber gasket 15.

Compared with the prior art, in the embodiment of the present disclosure, the image side surface 1221 of the first connection portion 122 of the first lens 12 includes the first planar surface 1221a, the first engaging oblique surface 1221b extending from the first planar surface 1221a in the direction facing towards the optical axis OO', and the second planar surface 1221c extending from the first engaging oblique surface 1221b in the direction facing towards the optical axis OO'; the first lens barrel 111 includes the first vertical portion 1111 fixedly connected to the second lens barrel 112 and the first horizontal portion 1112 extending from the first vertical portion 1111 while being bent towards the optical axis OO'; the surface of the first horizontal portion 1112, close to the image side, is fixedly attached to the object side surface 1222 of the first connection portion 122; the second lens barrel 112 includes the third planar surface 1121 spaced apart from the first planar surface 1221a, the first matching surface 1122 extending from the third planar surface 1121 in the direction facing towards the optical axis OO' and attaching to the first engaging oblique surface 1221b, and the fourth planar surface 1123 extending from the first matching surface 1122 in the direction facing towards the optical axis OO'; the fourth planar surface 1123 is spaced apart from the second planar surface 1221c; the second lens 13 includes the second optical portion 131 and the second connection portion 132 surrounding the second optical portion 131; the image side surface 1321 of the second connection portion 132 includes the fifth planar surface 1321a, the second engaging oblique surface 1321b extending from the fifth planar surface 1321a in the direction facing towards the image side and towards the optical axis OO', and the sixth planar surface 1321c extending from the second engaging oblique surface 1321b in the direction facing towards the optical axis OO'; and the second lens barrel 112 includes the seventh planar surface 1124 spaced apart from the fifth planar surface 1321a, the second matching surface 1125 extending from the seventh planar surface 1124 in the direction facing towards the image and towards the optical axis OO' and attaching to the second engaging oblique surface 1321a, and the eighth surface 1126 extending from the second matching surface 1125 in the direction facing towards the image side and in the direction parallel to the optical axis OO'. Compared with lenses known in the prior art, i.e., the lenses assembled in the lens barrel by simply stacking, the embodiment of the present disclosure can increase the accuracy of matching the first lens 12, the second lens 13 and the lens barrel 11, and thus guarantees the performance of the lens module 100. Meanwhile, since the second lens barrel 112 provides abutting positions for the first lens 12 and the second lens 13, the design freedom of the first lens 12 and the second lens 13 can be improved. The first lens 12 and the second lens 13 can be provided with different curvatures and path lengths, so as to meet different product requirements.

The details of the lens module provided by the present embodiment are specifically described below. The following content is merely intended to facilitate understanding of the details of the provided embodiments, but not to limit the present disclosure.

Figure 1:
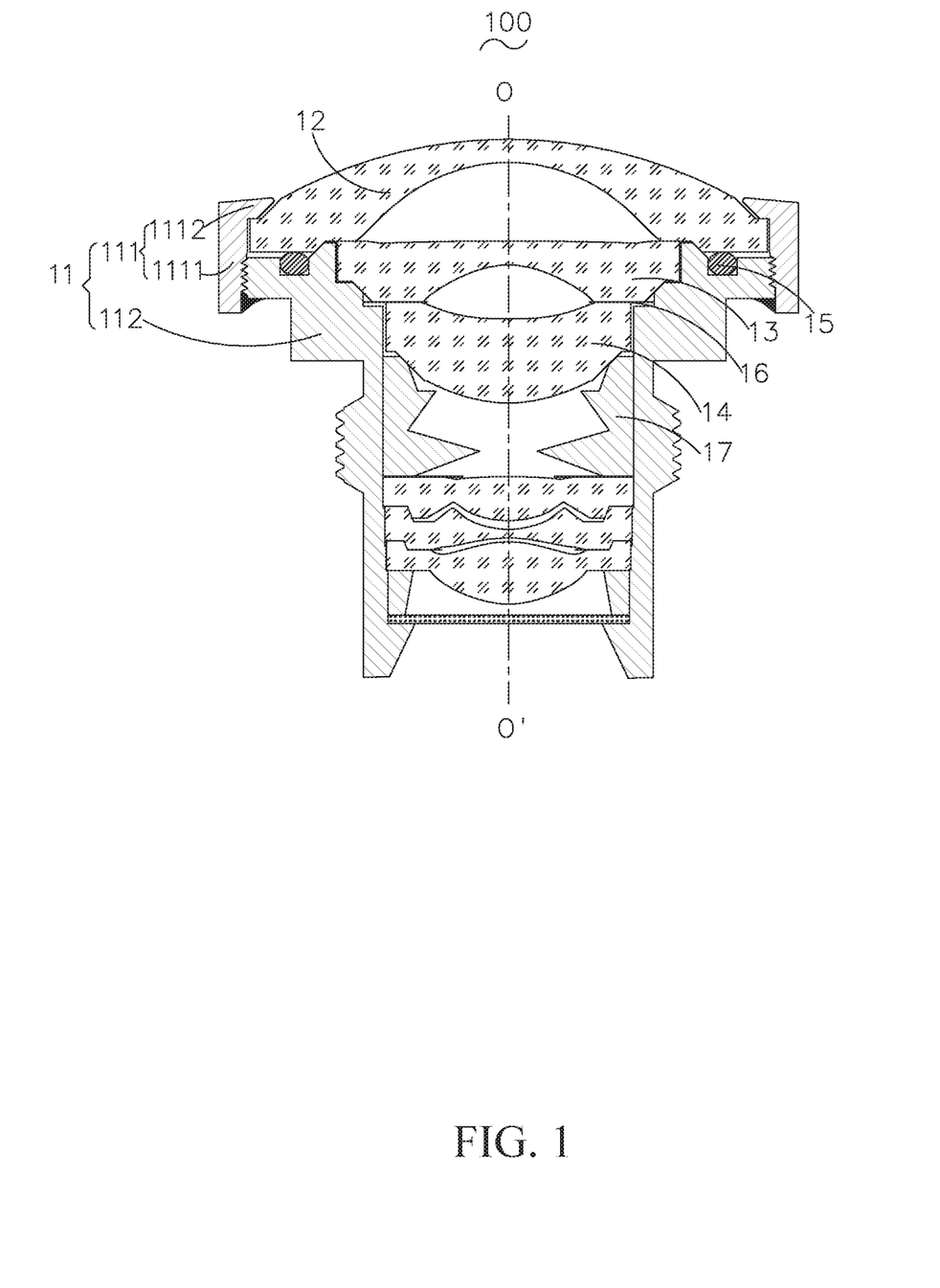
FIG. 1 is a schematic cross-sectional view of a lens module provided by a first embodiment of the present disclosure.
Figure 2:
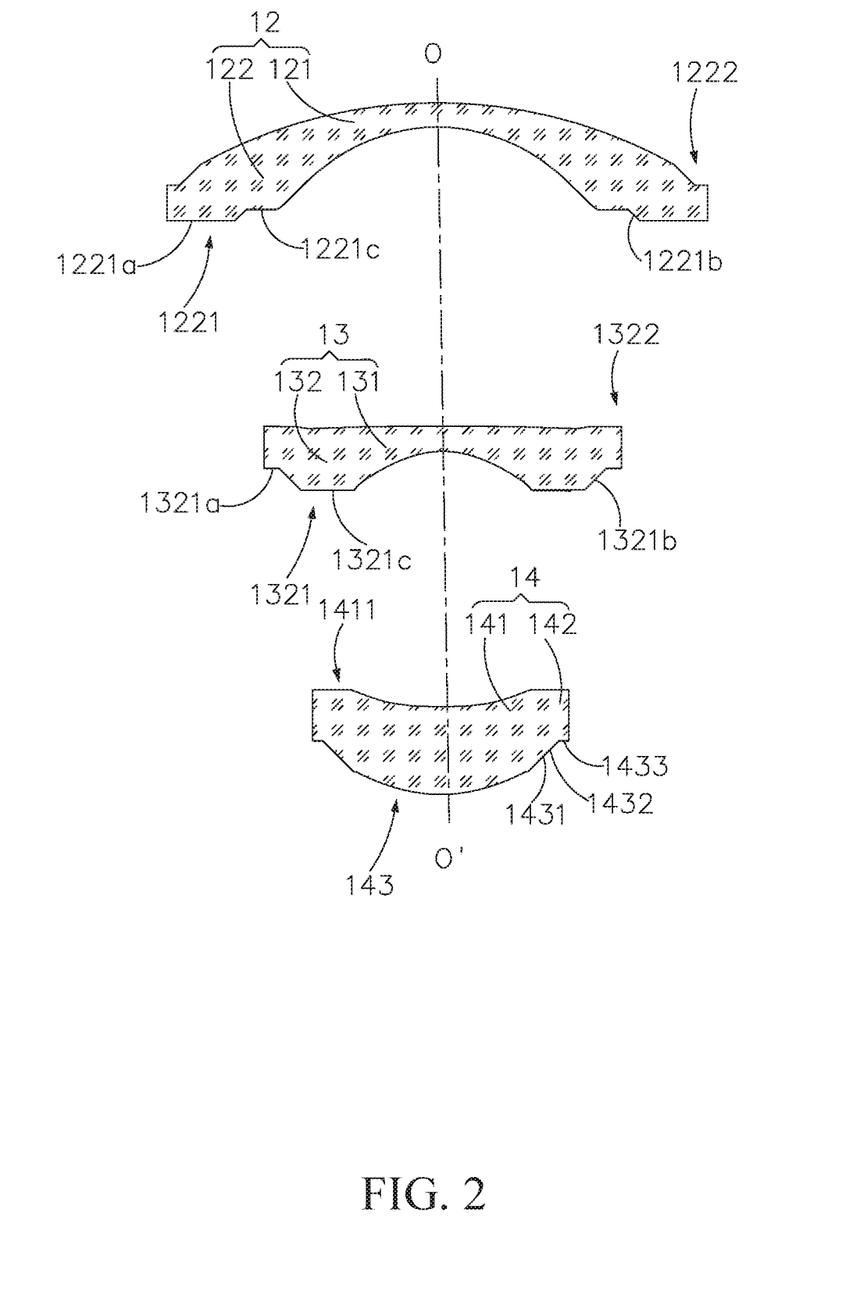
FIG. 2 is a schematic cross-sectional view of a first lens, a second lens and a third lens of the lens module provided by the first embodiment of the present disclosure.

For example, the second planar surface 1221c is abutted against an object side surface 1322 of the second connection portion 132. Through abutting between the second planar surface 1221c and the second connection portion 132, the first lens 12 can be stably disposed in the lens barrel 11.

Figure 3:
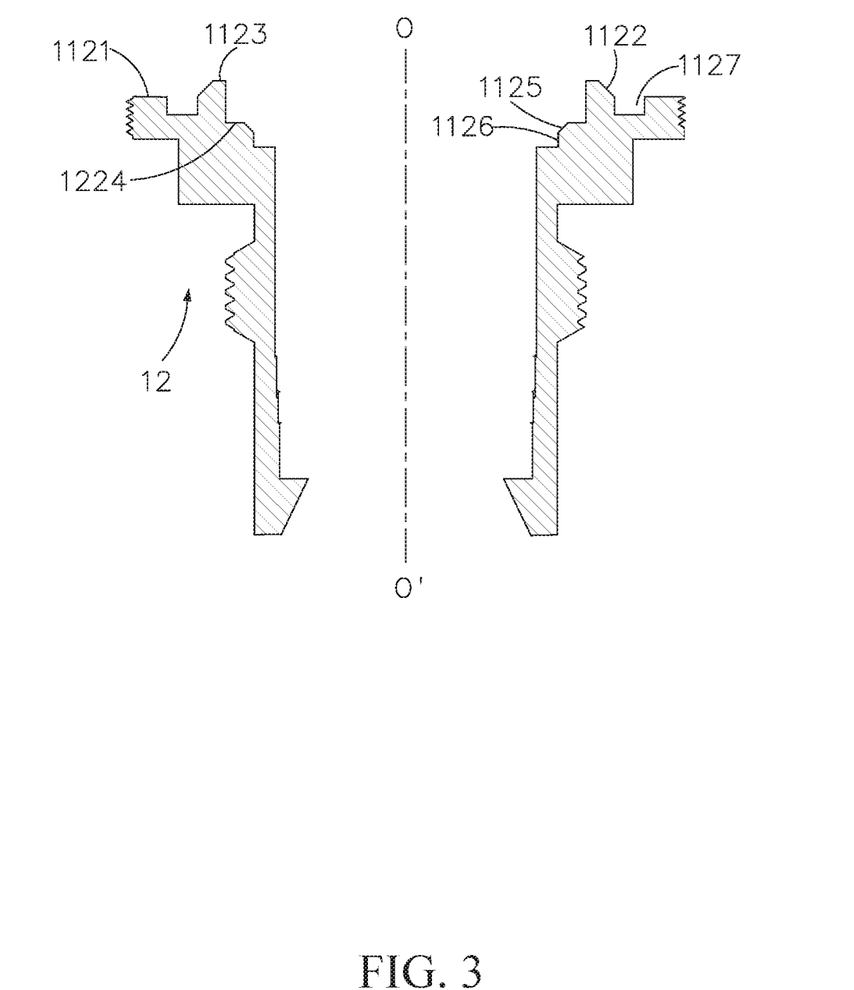
FIG. 3 is a schematic cross-sectional view of a lens barrel of the lens module provided by the first embodiment of the present disclosure.

Further, the first engaging oblique surface 1221b extends from the first planar surface 1221a in the direction facing towards the object side and towards the optical axis OO'. The first matching surface 1122 extends from the third planar surface 1121 in the direction facing towards the object side and towards the optical axis OO' and matches the first engaging oblique surface 1221b.

Figure 4:
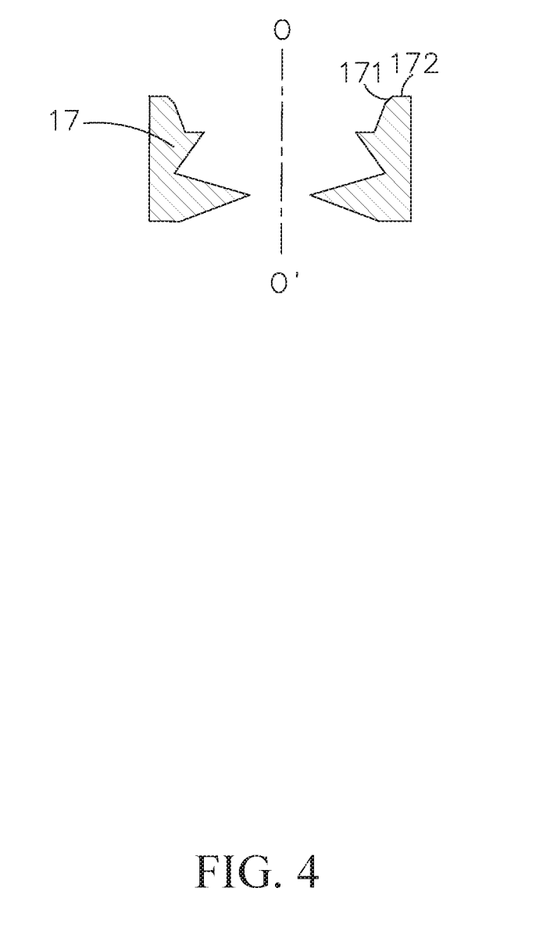
FIG. 4 is a schematic cross-sectional view of a light-shading sheet of the lens module provided by the first embodiment of the present disclosure.

In the present embodiment, the third lens 14 includes a third optical portion 141 and a third connection portion 142 surrounding the third optical portion 141. A first light-shading sheet 16 is disposed between the second lens 13 and the third lens 14. The first light-shading sheet 16 is located between the sixth planar surface 1321c and an object side surface 1411 of the third connection portion 141 and abuts against the eighth surface 1126.

In addition, a second light-shading sheet 17 is further disposed on an image side of the third lens 14. An image side surface 143 of the third lens 14 includes a third engaging oblique surface 1431 obliquely extending from the object side to the image side in the direction facing towards the optical axis OO'. The second light-shading sheet 17 is provided with a third matching surface 171 matching the third engaging oblique surface 1431. With this design, the matching accuracy between the third lens 14 and the second light-shading sheet 17 can be improved.

Further, the third lens 14 further includes a positioning surface 1432 extending from an end, facing away from the optical axis OO', of the third engaging oblique surface 1431 in a direction facing towards the object side and away from the optical axis OO', and a ninth planar surface 1433 extending from the positioning surface 1432 in a direction facing away from the optical axis OO'. The second light-shading sheet 17 includes a tenth planar surface 172 extending from an end, facing away from the optical axis OO', of the third matching surface 171 in the direction facing away from the optical axis OO'. The ninth planar surface 1433 is spaced apart from the tenth planar surface 172. The third lens 14 and the second light-shading sheet 17 can be prevented from rigid contacting or being pressed to damage the second light-shading sheet 17 or the third lens 14.

Besides, the first vertical portion 1111 and the second lens barrel 112 are connected by threads. The threaded fit is relatively firmer, such that the reliability of the lens module can be improved.

Moreover, the rubber gasket 15 is fixed to the groove 1127 by means of dispensing. The dispensing fixation method is simple and is relatively lower in cost.

A second embodiment of the present disclosure relates to a lens module 200, which is substantially the same as the first embodiment. The main differences therebetween are in that in the first embodiment as shown in FIGS. 1-4, the first engaging oblique surface 1221b extends from the first planar surface 1221a in the direction facing towards the object side and towards the optical axis OO', and the first matching surface 1122 extends from the third planar surface 1121 in the direction facing towards the object side and towards the optical axis OO' and matches the first engaging oblique surface 1221b.

Figure 5:
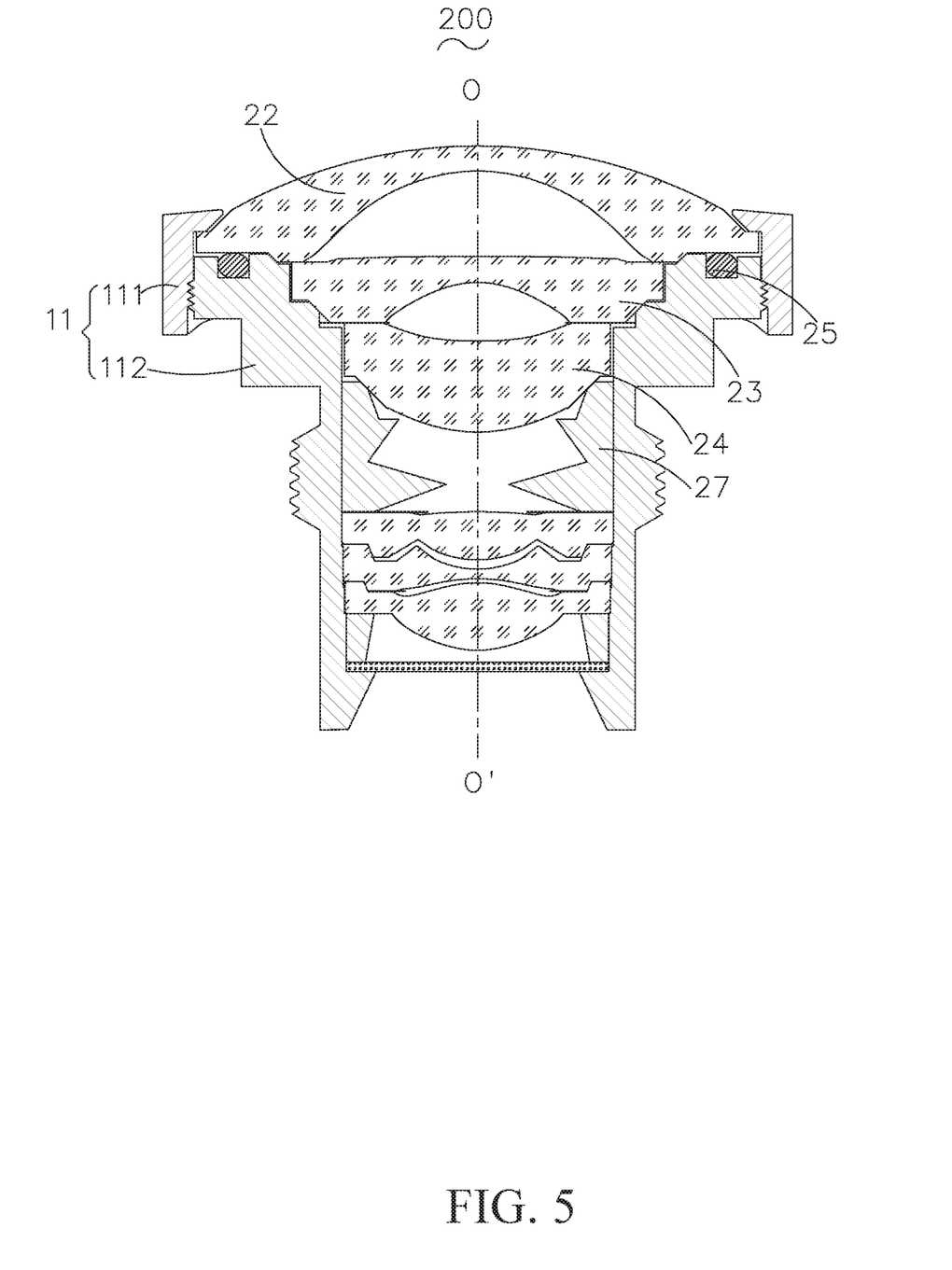
FIG. 5 is a schematic cross-sectional view of a lens module provided by a second embodiment of the present disclosure.
Figure 6:
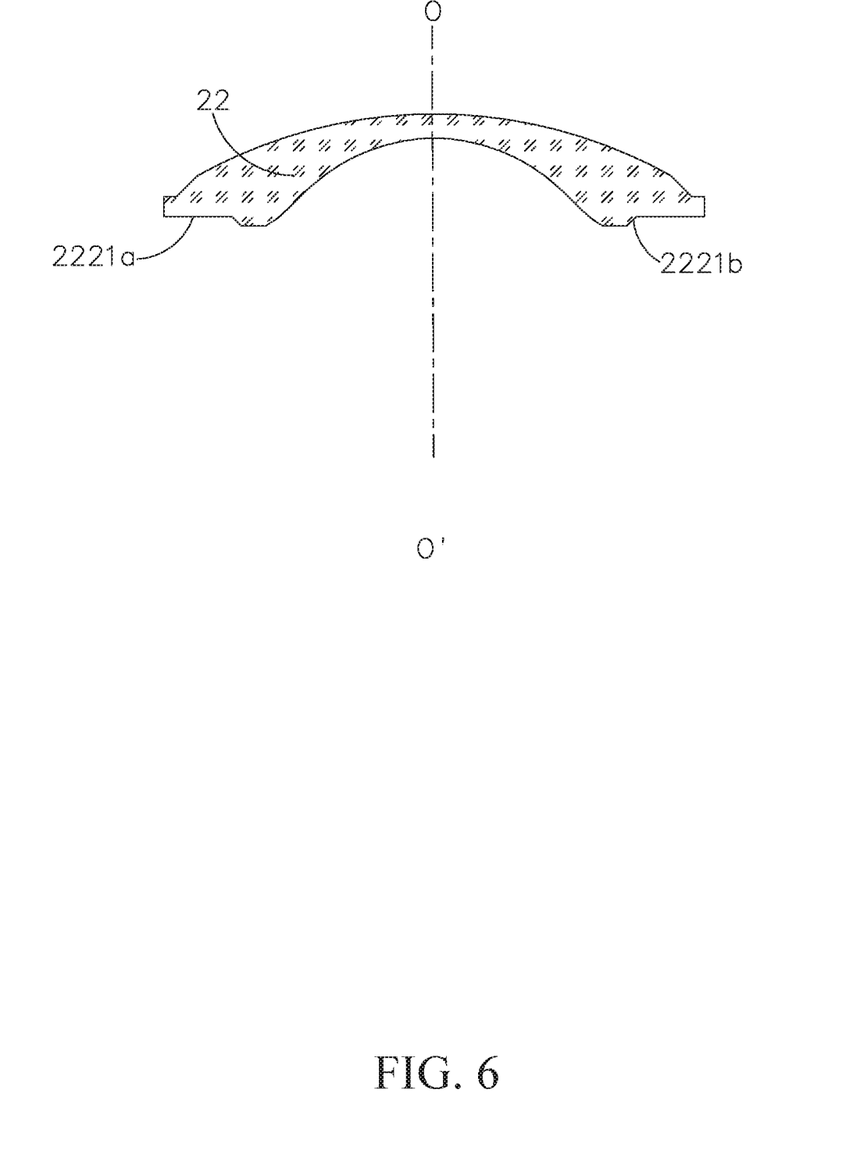
FIG. 6 is a schematic cross-sectional view of a first lens of the lens module provided by the second embodiment of the present disclosure.
Figure 7:
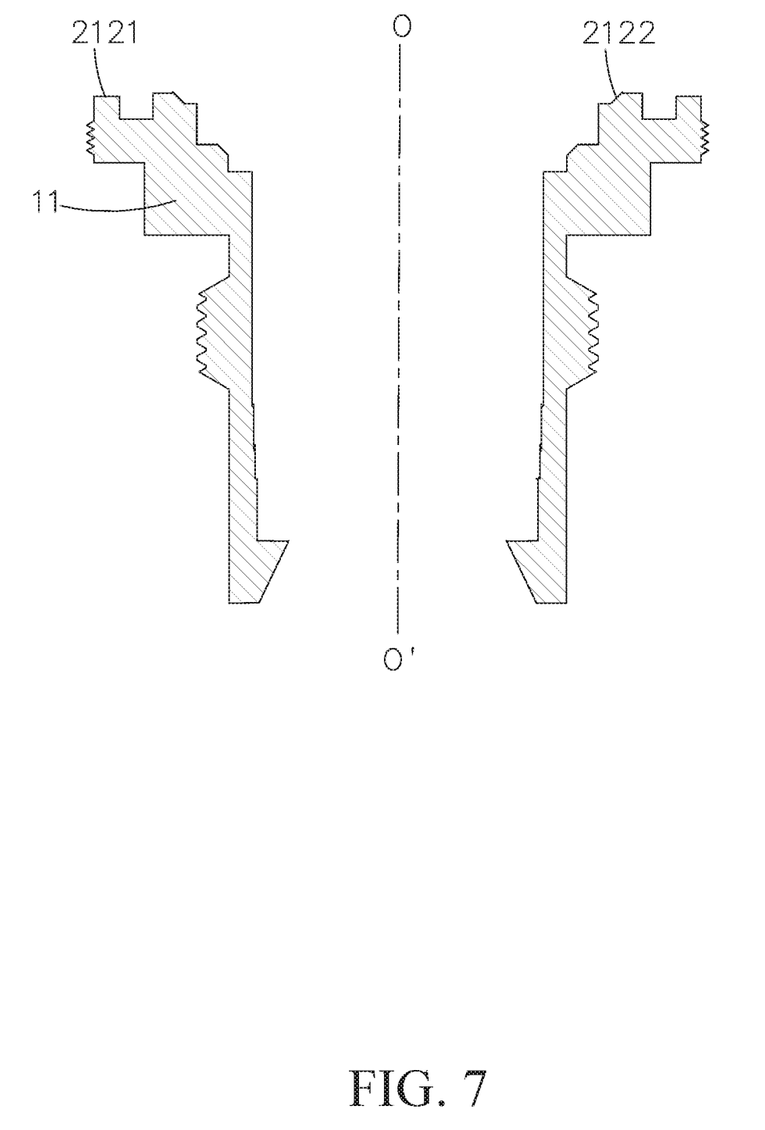
FIG. 7 is a schematic cross-sectional view of a lens barrel of the lens module provided by the second embodiment of the present disclosure.

In contrast, in the second embodiment of the present disclosure, as shown in FIGS. 5-7, the lens module 200 includes a lens barrel 21, a first lens 22, a second lens 23, a third lens 24, a rubber gasket 25, a first light-shading sheet 26 and a second light-shading sheet 27; the lens barrel 21 includes a first lens barrel 211 and a second lens barrel 212; a first engaging oblique surface 2221b extends from a first planar surface 2221a in the direction facing towards the image side and towards an optical axis OO'; a first matching surface 2122 extends from a third planar surface 2121 in the direction facing towards the image side and towards the optical axis OO' and matches the first engaging oblique surface 2221b.

Those skilled in the art may understand that the above embodiments are specific embodiments for implementing the present disclosure, and various changes and modification with respect to form or detail can be made without departing from the spirit and scope of the present disclosure.

What is claimed is:
1. A lens module, comprising:
a lens barrel;
a first lens;
a second lens; and
a third lens, the first lens, the second lens and the third lens being received in the lens barrel and sequentially stacked from an object side to an image side,
wherein the first lens comprises a first optical portion and a first connection portion surrounding the first optical portion, an image side surface of the first connection portion comprises a first planar surface, a first engaging oblique surface extending from the first planar surface in a direction facing towards an optical axis, and a second planar surface extending from the first engaging oblique surface in the direction facing towards the optical axis, the lens barrel comprises:
    a first lens barrel receiving the first lens, wherein the first lens barrel comprises a first vertical portion fixedly connected to the second lens barrel, and a first horizontal portion extending from the first vertical portion while being bent towards the optical axis, the first horizontal portion having a surface close to the image side and fixedly attached to an object side surface of the first connection portion; and
    a second lens barrel connected to the first lens barrel, wherein the second lens barrel comprises a third planar surface opposite to and spaced apart from the first planar surface; a first matching surface extending from the third planar surface in the direction facing towards the optical axis and matching the first engaging oblique surface, and a fourth planar surface extending from the first matching surface in the direction facing towards the optical axis, the fourth planar surface being spaced apart from the second planar surface, the second lens comprises a second optical portion and a second connection portion surrounding the second optical portion, an image side surface of the second connection portion comprises a fifth planar surface, a second engaging oblique surface extending from the fifth planar surface in a direction facing towards the image side and towards the optical axis, and a sixth planar surface extending from the second engaging oblique surface in the direction facing towards the optical axis, the second lens barrel further comprises a seventh planar surface opposite to and spaced apart from the fifth planar surface, a second matching surface extending from the seventh planar surface in the direction facing towards the image side and towards the optical axis and matching the second engaging oblique surface, and an eighth surface extending from the second matching surface in a direction facing towards the image side parallel to the optical axis, and the second lens barrel further comprises a groove formed by recessing from the third planar surface towards the image side, a rubber gasket is disposed in the groove, and the first lens is pressed against the rubber gasket.

2. The lens module as described in claim 1, wherein the second planar surface abuts against an object side surface of the second connection portion.

3. The lens module as described in claim 2, wherein the first engaging oblique surface extends from the first planar surface in a direction facing towards the object side and towards the optical axis, and the first matching surface extends from the third planar surface in the direction facing towards the object side and towards the optical axis and matches the first engaging oblique surface.

4. The lens module as described in claim 2, wherein the first engaging oblique surface extends from the first planar surface in the direction facing towards the image side and towards the optical axis, and the first matching surface extends from the third planar surface in the direction facing towards the image side and towards the optical axis and matches the first engaging oblique surface.

5. The lens module as described in claim 1, wherein the third lens comprises a third optical portion and a third connection portion surrounding the third optical portion, a first light-shading sheet is provided between the second lens and the third lens, and the first light-shading sheet is located between the sixth planar surface and an object side surface of the third connection portion and abuts against the eighth surface.

6. The lens module as described in claim 1, wherein a second light-shading sheet is further disposed on an image side of the third lens, an image side surface of the third lens comprises a third engaging oblique surface obliquely extending from the object side to the image side in the direction facing towards the optical axis, and the second light-shading sheet is provided with a third matching surface matching the third engaging oblique surface.

7. The lens module as described in claim 6, wherein the third lens further comprises a positioning surface extending from an end, facing away from the optical axis, of the third engaging oblique surface in a direction facing towards the object side and away from the optical axis, and a ninth planar surface extending from the positioning surface in a direction facing away from the optical axis,
    the second light-shading sheet comprises a tenth planar surface extending from an end, facing away from the optical axis, of the third matching surface in the direction facing away from the optical axis, and
    the ninth planar surface is spaced apart from the tenth planar surface.

8. The lens module as described in claim 1, wherein the first vertical portion and the second lens barrel are connected by threads.

9. The lens module as described in claim 1, wherein the rubber gasket is fixed to the groove by means of dispensing.

* * * * *